United States Patent
Royyuru

(10) Patent No.: US 10,049,356 B2
(45) Date of Patent: Aug. 14, 2018

(54) AUTHENTICATION OF CARD-NOT-PRESENT TRANSACTIONS

(75) Inventor: Vijay K. Royyuru, Norristown, PA (US)

(73) Assignee: First Data Corporation, Greenwood Village, CO (US)

(*) Notice: Subject to any disclaimer, the term of this patent is extended or adjusted under 35 U.S.C. 154(b) by 1115 days.

(21) Appl. No.: 12/641,598

(22) Filed: Dec. 18, 2009

(65) Prior Publication Data

US 2011/0153496 A1    Jun. 23, 2011

(51) Int. Cl.
*G06Q 20/40* (2012.01)
*G06Q 20/12* (2012.01)
*G06Q 20/38* (2012.01)
*H04L 29/06* (2006.01)

(52) U.S. Cl.
CPC ............ *G06Q 20/40* (2013.01); *G06Q 20/12* (2013.01); *G06Q 20/385* (2013.01); *H04L 63/08* (2013.01)

(58) Field of Classification Search
CPC ...... G06Q 20/40; G06Q 20/10; G06Q 20/385; G06Q 20/12; G06Q 20/20; G06Q 20/382; G06Q 20/02; G06Q 30/06; G06Q 20/32; G06Q 30/0601; G06Q 20/401; G06Q 20/3674; G06Q 20/3821; G06Q 20/4016; G06Q 20/206; G06Q 20/4012; G06Q 20/4014; G06Q 20/40145; G06Q 20/351; G06Q 20/4093; G06Q 20/3255; G06F 21/31; H04L 63/083; H04L 63/0838; H04L 9/3228; H04L 9/3226; H04L 2209/80; H04W 12/06; G07F 7/122; G07F 7/08

See application file for complete search history.

(56) References Cited

U.S. PATENT DOCUMENTS

| | | | |
|---|---|---|---|
| 5,585,787 A | 12/1996 | Wallerstein | |
| 5,883,810 A * | 3/1999 | Franklin | G06Q 20/02 235/379 |
| 5,913,203 A | 6/1999 | Wong et al. | |
| 5,937,394 A | 8/1999 | Wong et al. | |
| 5,955,961 A | 9/1999 | Wallerstein | |
| 5,956,699 A | 9/1999 | Wong et al. | |
| 6,592,044 B1 | 7/2003 | Wong et al. | |

(Continued)

*Primary Examiner* — Namrata Boveja
*Assistant Examiner* — Carol A See
(74) *Attorney, Agent, or Firm* — Kilpatrick Townsend & Stockton LLP

(57) ABSTRACT

Methods, systems, and machine-readable media are disclosed for processing a card-not-present transaction. According to one embodiment, processing a card-not-present transaction can comprise receiving a request for a card-not-present transaction involving an enrolled consumer. The request can include information identifying the enrolled consumer. A record of information related to the enrolled consumer can be read and the enrolled consumer can be authenticated based at least in part on the information of the request and the record of information related to the enrolled consumer. In response to authenticating the enrolled consumer, a set of single-use payment information can be generated which can include a one-time password and a dynamic Primary Account Number (PAN) which is valid for a single transaction. The single-use payment information can be provided to the enrolled consumer or the merchant to complete the transaction in place of the true PAN.

25 Claims, 5 Drawing Sheets

(56) References Cited

U.S. PATENT DOCUMENTS

| | | |
|---|---|---|
| 6,607,127 B2 | 8/2003 | Wong |
| 6,609,654 B1 | 8/2003 | Anderson et al. |
| 6,755,341 B1 | 6/2004 | Wong et al. |
| 6,805,288 B2 | 10/2004 | Routherstein et al. |
| 6,811,082 B2 | 11/2004 | Wong |
| 7,044,394 B2 | 5/2006 | Brown |
| 7,195,154 B2 | 3/2007 | Routherstein |
| 7,246,752 B2 | 7/2007 | Brown |
| 7,441,697 B2 * | 10/2008 | Fletcher ................ G06Q 20/12 235/375 |
| 7,472,829 B2 | 1/2009 | Brown |
| 7,822,666 B1 * | 10/2010 | Bursch .................... G06F 21/34 235/380 |
| 8,099,363 B1 * | 1/2012 | Kilchenstein, Jr. .... G06Q 20/10 705/35 |
| 2002/0066042 A1 * | 5/2002 | Matsumoto et al. ......... 713/202 |
| 2003/0080183 A1 | 5/2003 | Rajasekaran et al. |
| 2004/0177045 A1 | 9/2004 | Brown |
| 2005/0177750 A1 * | 8/2005 | Gasparini ............... G06F 21/31 726/5 |
| 2006/0249574 A1 | 11/2006 | Brown et al. |
| 2007/0136211 A1 | 6/2007 | Brown et al. |
| 2007/0208671 A1 | 9/2007 | Brown et al. |
| 2007/0241201 A1 | 10/2007 | Brown et al. |
| 2007/0250920 A1 * | 10/2007 | Lindsay .................. G06F 21/31 726/7 |
| 2008/0167961 A1 * | 7/2008 | Wentker ................ G06Q 20/10 705/14.25 |
| 2008/0201264 A1 * | 8/2008 | Brown ............... G06Q 20/3674 705/67 |
| 2009/0006262 A1 | 1/2009 | Brown et al. |
| 2009/0070260 A1 | 3/2009 | Flitcroft et al. |
| 2010/0088227 A1 * | 4/2010 | Belamant ........................ 705/41 |

\* cited by examiner

AUTHENTICATION OF CARD-NOT-PRESENT TRANSACTIONS

BACKGROUND OF THE INVENTION

Embodiments of the present invention generally relate to handling information related to financial transactions. More specifically, embodiments of the present invention relate to methods and systems for providing multi-factor authentication of e-commerce transactions while preventing exposure of private information.

E-commerce transactions such as those conducted online between a consumer and a merchant, for example through the merchant's website, are one example of card-not-present transactions. Generally speaking, a card-not-present transaction is any transaction where presentation or use of a physical card, e.g., swiping of a card including a magnetic stripe encoding account and/or other information, is not possible, practical, or desirable. Such transactions are currently conducted using the consumer's true (Primary Account Number), i.e., the account number embossed on the face of the card. For example, in an e-commerce transaction, the consumer enters and submits the true PAN to a merchant through a "checkout" page of the merchant's website.

However, e-commerce or other types of card-not-present transactions utilizing the true PAN of the purchaser/payor, or other party to the transaction raise a number of security concerns about the transaction. These concerns range from possible man-in-the-middle attacks, sniffing of transmission packets, attacks on merchant or other systems involved in the transaction, etc. Hence, there is a need in the art for improved methods and systems for processing of card-not-present transactions.

BRIEF SUMMARY OF THE INVENTION

Methods, systems, and machine-readable media are disclosed for providing multi-factor authentication of card-not-present transactions, such as e-commerce transactions, while preventing exposure or loss of private payment information. According to one embodiment, a system can comprise a merchant system providing an e-commerce website, a client device adapted to access the e-commerce website, and a payment processor system communicatively coupled with the merchant system and the client device. The payment processor system can maintain enrollment information for a user of the client device. For example, the enrollment information for the user of the client device can include a true Primary Account Number (PAN) and other information such as a phone number, an email address, etc. The client device can initiate a card-not-present transaction with the merchant system through the e-commerce website and request a set of single-use payment information from the payment processor system.

The payment processor system can receive the request for the card-not-present transaction. The request for the card-not-present transaction can be received from the client device or the merchant system. In either case, the request can include information identifying the user of the client device but which is not sufficient for conducting a financial transaction. For example, the information identifying the user of the client device can comprise one or more of a phone number, an email address, a last four digits of the true PAN and/or other such identifying information.

The payment processor system can read the enrollment information for the user of the client device and authenticate the user of the client device based at least in part on the information of the request identifying the user of the client device and the enrollment information for the user of the client device. In response to authenticating the user of the client device, the payment processor system can generate the set of single-use payment information. The set of single-use payment information can include at least a one-time password and a dynamic Primary Account Number (PAN). The dynamic PAN can be valid for a single transaction and does not reveal a true PAN of the user of the client device.

The payment processor system can provide the single-use payment information to the user of the client device. For example, providing the single-use payment information to the enrolled consumer can comprise sending an email message including the single-use payment information from the payment processor system to the email address of the enrollment information. In another example, the system may further comprise a mobile phone of the user. In such a case, a phone number in the enrolled information can comprise a phone number of the mobile phone and providing the single-use payment information to the enrolled consumer can comprise sending a Short Message Service (SMS) message including the single-use payment information from the payment processor system to the mobile phone.

The client device can provide to the merchant system the dynamic PAN and cardholder verification information to affect payment of the card-not-present transaction. The merchant system can in turn receive the dynamic PAN and cardholder verification information and send a request to process payment of the card-not-present transaction to the payment processor system. The request can include the dynamic PAN and cardholder verification information. For example, the cardholder verification information can comprise the one-time password. In another example, the cardholder verification information can comprise the one time password combined with a Personal Identification Number (PIN) of the user of the client device.

The payment processor system can receive the request to process payment of the card-not-present transaction from the merchant system and authenticate the request to process payment of the card-not-present transaction based on the dynamic PAN and cardholder verification information from the request to process payment of the card-not-present transaction. In response to authenticating the request to process payment of the card-not-present transaction, the payment processor system can determine the true PAN for the user of the client device from the enrollment information for the user of the client device and process payment of the card-not-present transaction using the true PAN for the user of the client device.

According to another embodiment, a method of processing a card-not-present transaction can comprise receiving a request for a card-not-present transaction involving an enrolled consumer. Receiving the request for the card-not-present transaction can comprise receiving the request from a client device of the enrolled consumer or from a merchant system of a merchant participating in the transaction. The request can include information identifying the enrolled consumer but which is not sufficient for conducting a financial transaction. For example, the information identifying the enrolled consumer can comprise one or more of a phone number of the enrolled consumer, an email address of the enrolled consumer, a last four digits of the true PAN, and/or other such information.

A record of information related to the enrolled consumer can be read. The record of information related to the consumer can include, for example, the true PAN and other information such as a phone number of the enrolled consumer, an email address of the enrolled consumer, etc. The enrolled consumer can be authenticated based at least in part on the information of the request identifying the enrolled consumer and the record of information related to the enrolled consumer. In response to authenticating the enrolled consumer, a set of single-use payment information can be generated. The set of single-use payment information can include at least a one-time password and a dynamic Primary Account Number (PAN), the dynamic PAN being valid for a single transaction and not revealing a true PAN of the enrolled consumer. Generating the dynamic PAN can be based on the true PAN but the dynamic PAN does not reveal the true PAN. In some cases, the dynamic PAN may retain a portion of the true PAN for routing of a request to process payment of the card-not-present transaction to a payment processor system via a payment network. In some other cases, the dynamic PAN may retain some or all of the right-most 4 to 14 digits of the true PAN, for example to preserve consumer familiarity with the last 4 digits of the PAN.

The single-use payment information can be provided to the enrolled consumer. For example, providing the single-use payment information from the payment processor to the enrolled consumer can comprise sending an email message to the email address of the enrolled consumer. Additionally or alternatively, the phone number of the enrolled consumer can comprise a phone number of a mobile phone and providing the single-use payment information from the payment processor to the enrolled consumer can comprise sending a Short Message Service (SMS) message to the phone number of the enrolled consumer. Additionally or alternatively, providing the single-use payment information from the payment processor for the card-not-present payment transaction, can comprise sending some portion of, or all of, the set of single use payment information directly from the payment processor to the merchant system.

A request to process payment of the card-not-present transaction can be received. The request can include the dynamic PAN and cardholder verification information. For example, the cardholder verification information can comprise the one-time password. In another example, the cardholder verification information can comprise the one time password combined with a Personal Identification Number (PIN) of the enrolled consumer. The request to process payment of the card-not-present transaction can be authenticated based on the dynamic PAN and cardholder verification information from the request to process payment of the card-not-present transaction. In response to authenticating the request to process payment of the card-not-present transaction, the true PAN for the enrolled consumer can be determined and payment of the card-not-present transaction can be processed using the true PAN for the enrolled consumer.

According to yet another embodiment, a method of conducting a card-not-present transaction can comprise initiating a card-not-present transaction. Initiating the card-not-present transaction can comprise providing to a payment processor system information identifying an enrolled consumer. In response, a set of single-use payment information can be received. For example, receiving the set of single-use payment information can comprise receiving an email message or a Short Message Service (SMS) message. The set of single-use payment information can include at least a one-time password and a dynamic Primary Account Number (PAN). The dynamic PAN can be valid for a single transaction and does not reveal a true PAN of an enrolled consumer. The dynamic PAN and cardholder verification information can be provided to a merchant system to affect payment of the card-not-present transaction. For example, the cardholder verification information can comprise the one time password combined with a Personal Identification Number (PIN) of the enrolled consumer.

DETAILED DESCRIPTION OF THE INVENTION

Figure 1:
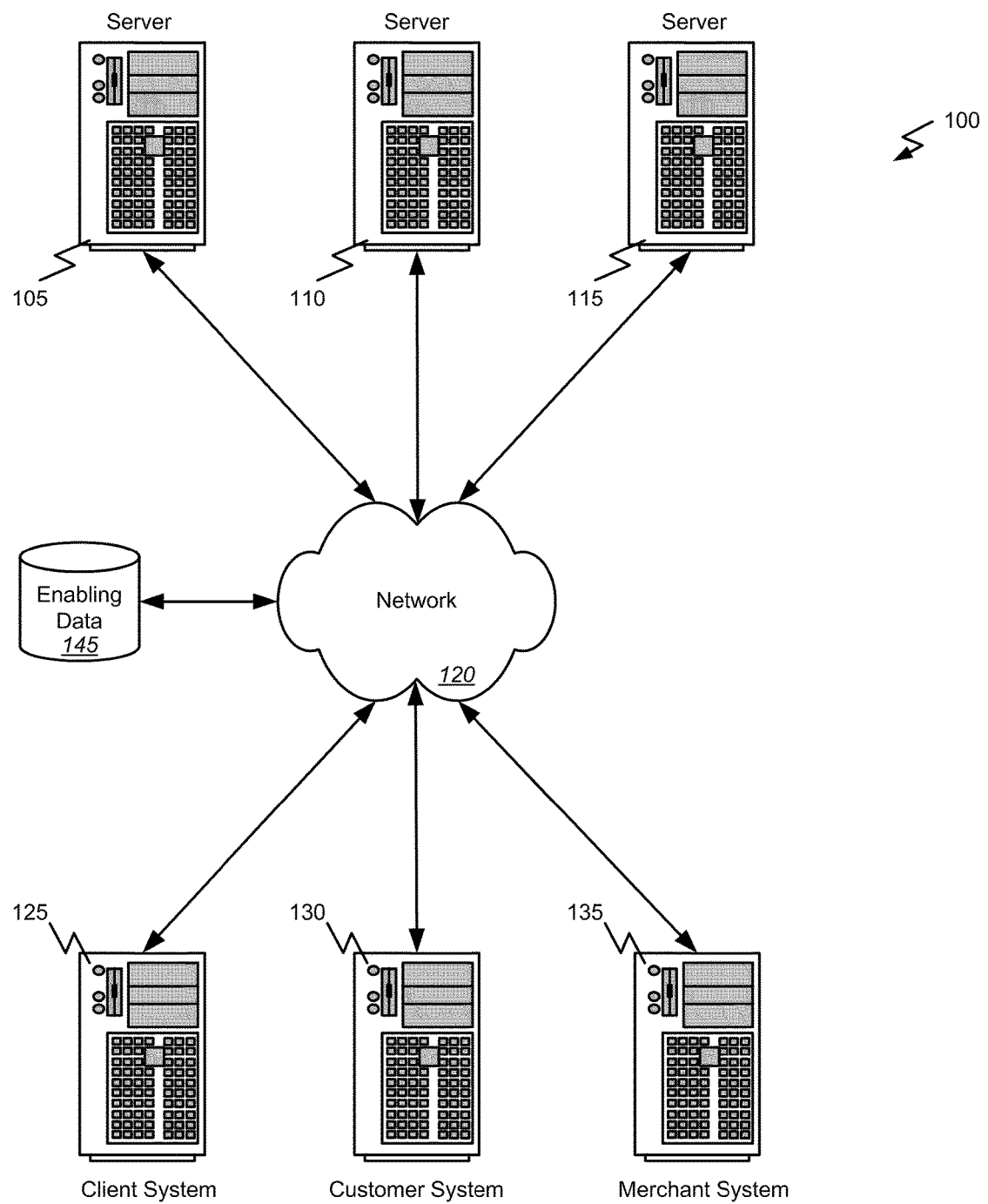
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions as well as other information related to one or more financial accounts. In some such embodiments, the processes are executed by an entity on behalf of one or more client organizations. The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "payment processor" refers to an entity that receives purchase transaction information from a merchant or other entity and, based on account identifier information, routes the transaction information over an electronic funds transfer network to an issuer of the account being used for payment.

A "payment network" refers herein to an infrastructure that supports that exchange of data in implementing financial transactions. It is anticipated that the data exchange typically proceeds between merchants and financial institutions. Examples of existing commercial networks that are included within the definition of "payment network" include the STAR network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

The terms "real time" or "near real time" are used herein to refer to a process or action that occurs within a relatively short time. Importantly, the terms real time and near real time are not intended to imply an immediate or instantaneous results or action. Rather, the terms are used to refer to process or actions that can be performed relatively quickly such as within several seconds or minutes.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for enabling card-not-present transactions, e.g., e-commerce transactions on the Internet, with multi-factor authentication and without exposing a true Primary Account Number (PAN) of an account used in the transaction. Generally speaking, a payment processor system, i.e., a third party system for processing payment transactions between entities such as between a consumer and a merchant, can provide a Customer Service Representative (CSR) application and a companion web service on for first-time enrollment of consumers and for on-going customer service. Financial Institution (FI) CSRs can use this service to enroll and support consumers in a card-not-present payment service, e.g., for use in online, e-commerce, or other transactions in which physical presence of a card in not possible or desired. Authentication of these requests can be done using common out-of-band "Know Your Customer" techniques. Regardless of exactly how it is performed, enrollment of a consumer in the service can result in registration of various consumer information including but not limited to a true Primary Account Number (PAN) of an account to be used for card-not-present transactions, a mobile phone number for the consumer, an email address for the consumer, a Personal Identification Number (PIN), and/or other identifying information.

Once enrolled, the consumer can begin a card-not-present payment experience by requesting a dynamic PAN and one time password (OTP) from the service, for example by Short Message Service (SMS) or email. The payment processor system can generate and deliver the dynamic PAN and OTP, for example, by email or SMS. The consumer can then use the dynamic PAN and OTP in place of the true PAN to conduct the card-not-present transaction. For example, the consumer can enter the dynamic PAN in a "Card Number" field of payment page of a merchant's e-commerce website. Additional, the consumer may use the, OTP, either alone or in combination with a Personal Identification Number (PIN) in a "Cardholder Verification" (CV) or other appropriate field on the merchant's payment page. The merchant in turn can submit this information to the payment processor system as it normally would with a true PAN and CV. Upon receipt from the merchant system, the payment processor system can authenticates the transaction, convert the dynamic PAN and OTP to the true PAN and process the payment, e.g., submit the transaction to a financial institution or other issuer. Successful usage of a registered mobile phone in the request or receipt of the dynamic PAN and OTP allows the mobile phone to be considered a "something-you-have" authentication factor for the transaction, i.e., via the phone number of the enrollment information. A PIN or other identifying information, if used, e.g., in combination with the OTP, can be considered a "something-you-know authentication" factor for the transaction.

Stated another way, methods, systems, and machine-readable media are disclosed for processing a card-not-present transaction. According to one embodiment, processing a card-not-present transaction can comprise receiving a request for a card-not-present transaction involving an enrolled consumer. The request can include information identifying the enrolled consumer. A record of information related to the enrolled consumer can be read and the enrolled consumer can be authenticated based at least in part on the information of the request and the record of information related to the enrolled consumer. In response to authenticating the enrolled consumer, a set of single-use payment information can be generated which can include a one-time password and a dynamic Primary Account Number (PAN) which is valid for a single transaction. The single-use payment information can be provided to the enrolled consumer to complete the transaction in place of the true PAN. Additional details of various exemplary embodiments of the present invention will be described below with reference to the figures.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc. For example, the enabling data 145 can include a set of keys, i.e., private keys held by the payment processor and/or financial institution and relating to the card-level keys of the individual cards, and that can be used to decrypt the dynamic PAN to determine the real PAN for a transaction as will be described further below.

Figure 2:
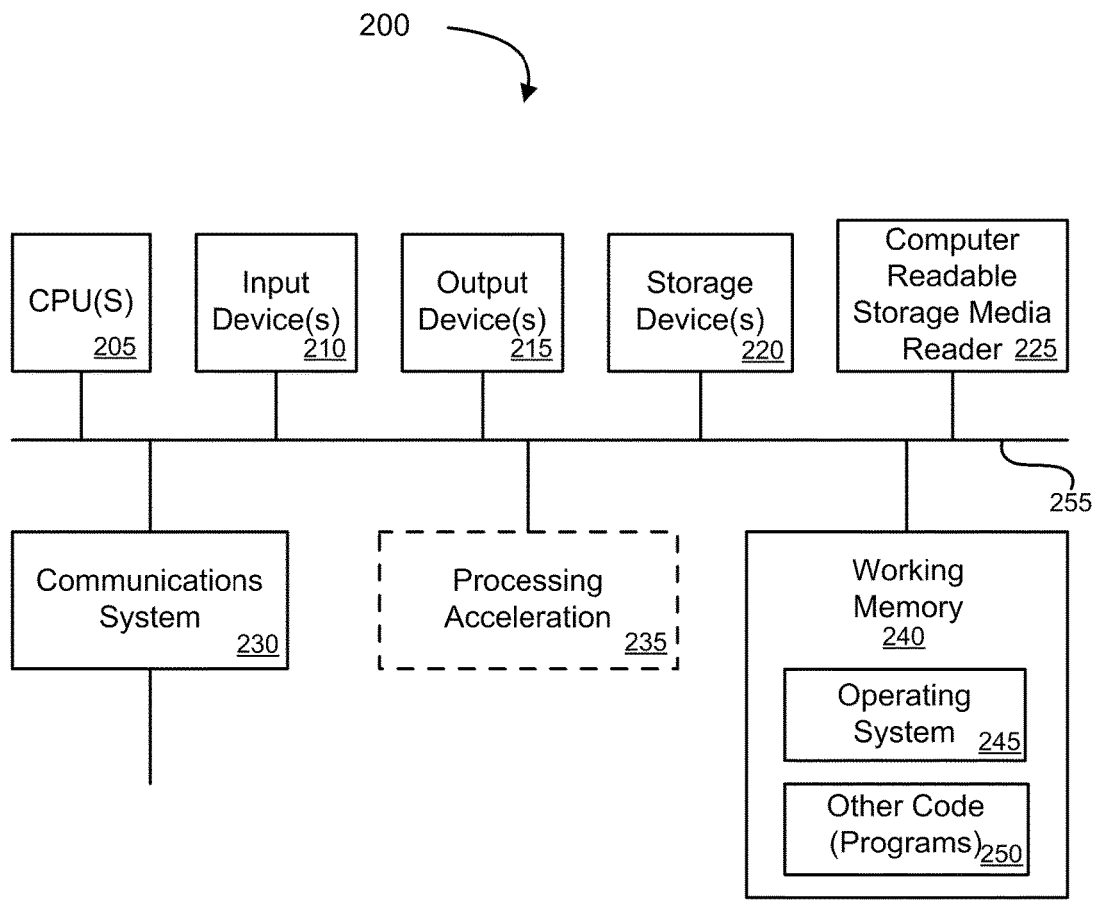
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
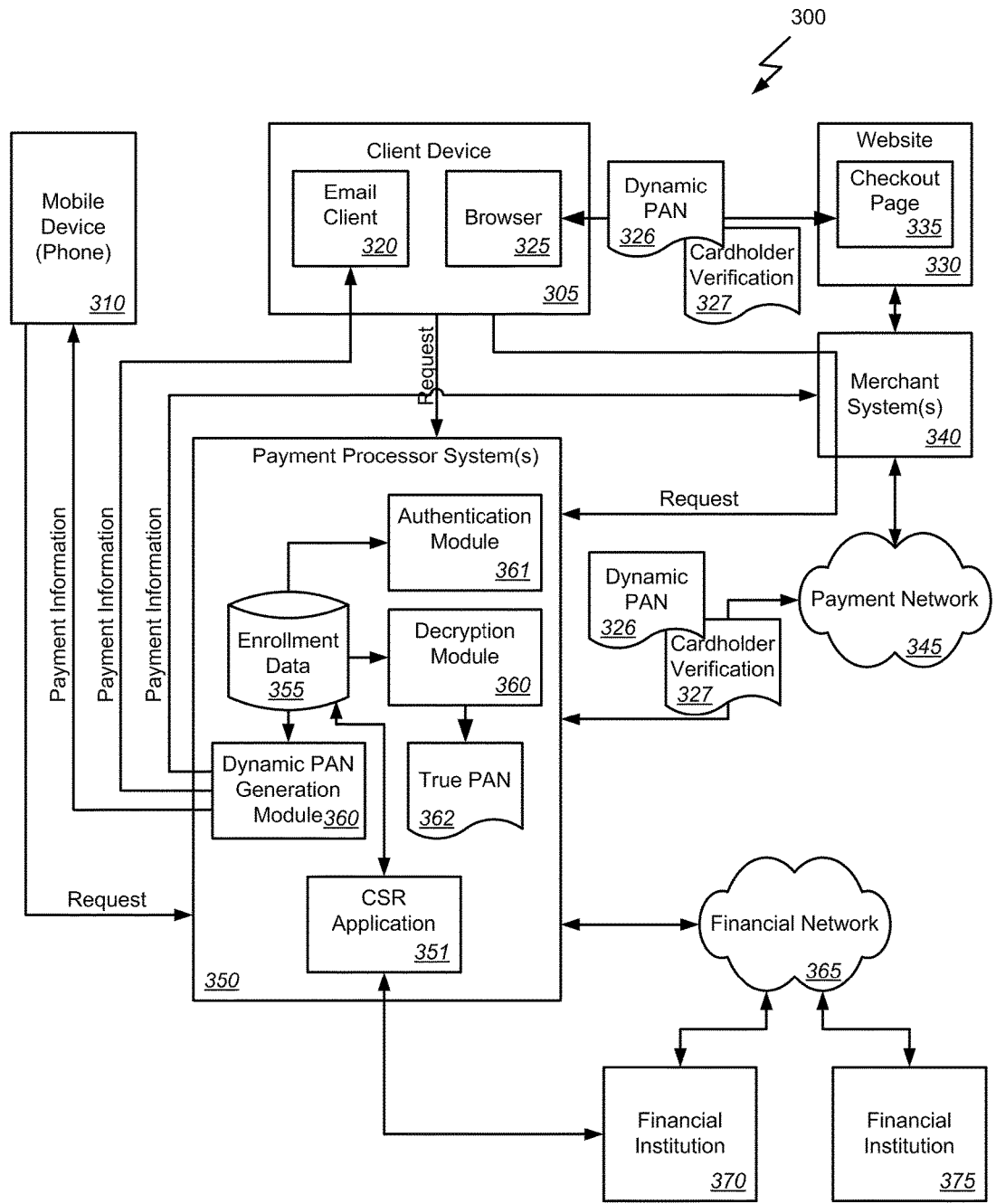
FIG. 3 is a block diagram illustrating, at a high level, a system for processing a card-not-present transaction according to one embodiment of the present invention.

FIG. 3 is a block diagram illustrating, at a high level, a system for processing a card-not-present transaction according to one embodiment of the present invention. In this example, the system 300 includes a payment processor system 350, i.e., a third party system for processing payment transactions between entities such as between a consumer and a merchant. The payment processor system 350 can provide a Customer Service Representative (CSR) application 351 and a companion web service on for first-time enrollment of consumers and for on-going customer service. Financial Institution (FI) 370 or 375 CSRs can use this application 351, e.g., via the Internet (not shown here) or another network 365, to enroll and support consumers in a card-not-present payment service of the payment processor system 350, e.g., for use in online, e-commerce, or other transactions in which physical presence of a card in not possible or desired. Authentication of these requests by the payment processor system 350 can be done using common out-of-band "Know Your Customer" techniques. Regardless of exactly how it is performed, enrollment of a consumer in the service can result in registration of various consumer information by the payment processor system 350 including but not limited to a true Primary Account Number (PAN) of an account to be used for card-not-present transactions, a mobile phone number for the consumer, an email address for the consumer, a Personal Identification Number (PIN), and/or other identifying information which can be stored in a repository 355 of enrollment data. It should be noted that, while illustrated here as part of or within the payment processor system 350, such an implementation is not required. Rather, in other implementations, the enrollment data repository 355 may be maintained separate from but accessible by the payment processor system 350. In fact, in some implementations, the CSR application 351 may also be implemented on or by another system and/or entity rather than but on behalf of the payment processor. Other variations in implementations of the enrollment process and data are similarly contemplated and considered to be within the scope of the present invention.

The system 300 can also comprise a merchant system 340 providing an e-commerce website 330 and a client device 305 such as a desktop or laptop computer, Personal Digital Assistant, smartphone, or other computing device. The client device 305 can be adapted to access the e-commerce website 330, for example over the Internet or other network (not shown here) via a browser application 325 of the client device 305. As commonly understood, the consumer/user of the client device 305 can then browse and shop the e-commerce website 330. At some point during this interaction, the client device 305 can initiate a card-not-present transaction with the merchant system 340. That is, once enrolled, the consumer operating the client device 305 can begin a card-not-present payment experience. For example, the user of the client device 305 may select a card-not-present payment option through the e-commerce website, e.g., by clicking or selecting a link or button of a checkout page 335 or other page of the e-commerce website 335, and thereby request a set of single-use payment information from the payment processor system 350. In another example, the client device 305, e.g., via initiation of an application or applet (not shown here) may generate and send a Short Message Service (SMS) or email message to the payment processor system 305 requesting single-use payment information. In another example, the mobile device 310 may generate and send a message to the payment processor system 305 requesting single-use payment information.

Regardless of exactly how the transaction is initiated, the payment processor system 350 can receive the request for the card-not-present transaction. The request for the card-not-present transaction can be received from either the client device 305 or the merchant system 340 as noted above. In either case, the request can include information identifying the user of the client device 305 but which is not sufficient for conducting a financial transaction. For example, the information identifying the user of the client device can comprise one or more of a phone number, an email address, a last four digits of the true PAN and/or other such identifying information. For example, such identifying information may be collected from the user via the checkout page 335 or other page of the e-commerce website 330 or can be collected or generated by the client device 305, e.g., based on currently or previously entered information from the user.

The payment processor system 350 can read the enrollment information 355 for the user of the client device 305 and authenticate the user of the client device 305, e.g., via an authentication module 361, based at least in part on the information of the request identifying the user of the client device 305 and the enrollment information 355 for the user of the client device 305. In response to authenticating the user of the client device 305, the payment processor system 350 can generate, e.g., via generation module 360, the set of single-use payment information. The set of single-use payment information can include at least a one-time password and a dynamic Primary Account Number (PAN). The dynamic PAN can be valid for a single transaction and does not reveal a true PAN of the user of the client device.

Generation of dynamic PAN can be implemented in a variety of different manners without departing from the scope of the present invention. In one example, the dynamic PAN can be calculated in a manner similar to the methods and systems described in r commonly assigned U.S. patent application Ser. No. 12/357,579 filed on Jan. 22, 2009 by Royyuru et al. and entitled "Dynamic Primary Account Number (PAN) and Unique Key Per Card" which is incorporated herein by reference for all purposes. In some cases, such as described in the related application, the dynamic PAN can comprise an encrypted form of a real PAN of the financial account that is valid for a single transaction. According to one embodiment, a portion of the real PAN can be retained and used "in the clear" as part of the dynamic PAN or otherwise as part of the transaction. For example, a portion of the real PAN used for routing of the transaction can be maintained in the clear, i.e., unencrypted, so that the transaction can be properly routed through the payment network or other network. According to another embodiment, the dynamic PAN can be constructed with a new prefix of 6 or more left-most digits, such that routing of the transactions using this new prefix results in the transaction being delivered to a payment processor with the keys and capability to decrypt the dynamic PAN or otherwise determine the true PAN based on the dynamic PAN.

The payment processor system 350 can provide the single-use payment information to the user of the client device 305. For example, providing the single-use payment information to the enrolled consumer/user can comprise sending an email message including the single-use payment information from the payment processor system 350 to the email address of the enrollment information 355, i.e., an email address registered by the user/consumer during enrollment to be received and read by an email client application 320 of the client device 305. In another example, the system may further comprise a mobile phone 310 or other mobile device of the user/consumer. In such a case, a phone number in the enrolled information 355, i.e., registered by the user/consumer during enrollment, can comprise a phone number of the mobile phone 310 and providing the single-use payment information to the enrolled consumer/user can comprise sending an email message or a Short Message Service (SMS) message including the single-use payment information from the payment processor system 305 to the mobile phone 310. In another case, providing the single-use payment information to the enrolled consumer/user can comprise sending the data to the application or applet (not shown) on the mobile phone 310.

The consumer/user can then use the dynamic PAN and OTP in place of the true PAN to conduct the card-not-present transaction. For example, the consumer can enter the dynamic PAN in a "Card Number" field of the checkout page 335 or other page of the merchant's e-commerce website 330. Additional, the consumer may use the, OTP, either alone or in combination with a Personal Identification Number (PIN) in a "Cardholder Verification" (CV) or other appropriate field on the merchant's checkout page 335. In other words, the client device 305 can provide to the merchant system 340 the dynamic PAN 326 and cardholder verification information 327 to affect payment of the card-not-present transaction. The merchant system 340 can in turn receive the dynamic PAN 326 and cardholder verification information 327 and send a request to process payment of the card-not-present transaction to the payment processor system 305, for example via a payment network 345. The request can include the dynamic PAN 326 and cardholder verification information 327. In other words, the merchant system 340 can submit this information to the payment processor system 305 as it normally would with a true PAN and CV.

Upon receipt from the merchant system 340, the payment processor system 305 can authenticate the transaction, convert the dynamic PAN and OTP to the true PAN 362, e.g., via decryption module 360, and process the payment, e.g., submit the transaction to a financial institution 370 or 375 or other issuer via a financial or other network 365. In other words, the payment processor system 305 can receive the request to process payment of the card-not-present transaction from the merchant system 340 and authenticate the request to process payment of the card-not-present transaction, e.g., via authentication module 361, based on the dynamic PAN and cardholder verification information from the request to process payment of the card-not-present transaction. In response to authenticating the request to process payment of the card-not-present transaction, the payment processor system 350 can determine the true PAN for the user of the client device 305, for example via decryption module 360 and/or from the enrollment information 355 for the user of the client device 305, and process payment of the card-not-present transaction using the true PAN 362 for the user of the client device.

It should be noted that while described herein with reference to an e-commerce transaction conducted through a merchant's e-commerce website, such an implementation is not required. Rather, embodiments of the present invention are thought to be equally useful with other implementations of a card-not-present transaction. That is, embodiments of the present invention may be implemented to process any transaction wherein presentation or use of a physical card or information therefrom is not possible, practical, or desirable. For example, embodiments of the present invention may be implemented to support transactions through a point-of-sale terminal of a merchant wherein the consumer can receive and supply, manually or through a mobile device, the dynamic PAN and OTP in place of a true PAN and CV information. Other variations are contemplated and considered to be within the scope of the present invention.

Figure 4:
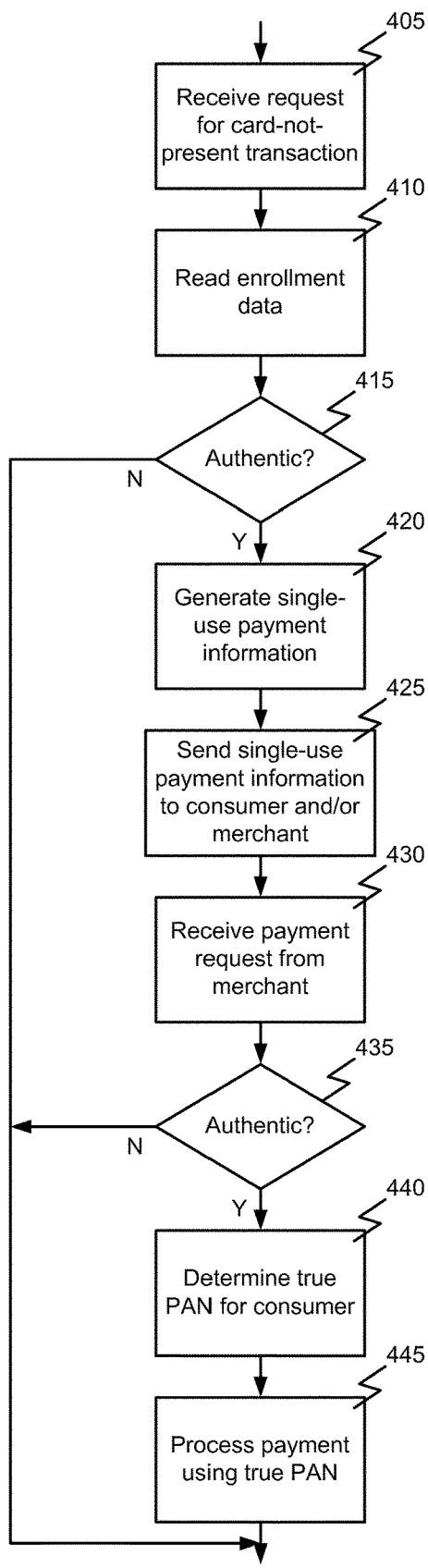
FIG. 4 is a flowchart illustrating a process for processing of a card-not-present transaction according to one embodiment of the present invention.

FIG. 4 is a flowchart illustrating a process for processing of a card-not-present transaction according to one embodiment of the present invention. More specifically, this example illustrates processes as may be performed by a payment processor system as described above. In this example, processing begins with receiving 405 a request for a card-not-present transaction involving an enrolled consumer. Receiving 405 the request for the card-not-present transaction can comprise receiving the request from a client device of the enrolled consumer or from a merchant system of a merchant participating in the transaction. The request can include information identifying the enrolled consumer but which is not sufficient for conducting a financial transaction. For example, the information identifying the enrolled consumer can comprise one or more of a phone number of the enrolled consumer, an email address of the enrolled consumer, a last four digits of the true PAN, and/or other such information.

A record of information related to the enrolled consumer can be read 410, i.e., based on the identification information from the request. The record of information related to the consumer can include, for example, the true PAN and other information such as a phone number of the enrolled consumer, an email address of the enrolled consumer, etc. A determination 415 can be made based on the identification information from the request and the enrollment data as to whether the requestor/consumer is authentic. That is, the enrolled consumer can be authenticated based at least in part on the information of the request identifying the enrolled consumer and the record of information related to the enrolled consumer. If 415 the enrolled consumer authenticated, a set of single-use payment information can be generated 420. The set of single-use payment information can include at least a one-time password and a dynamic Primary Account Number (PAN), the dynamic PAN being valid for a single transaction and not revealing a true PAN of the enrolled consumer. Generating 420 the dynamic PAN can be based on the true PAN but the dynamic PAN does not reveal the true PAN. In some cases, the dynamic PAN may retain a portion of the true PAN for routing of a request to process payment of the card-not-present transaction to a payment processor system via a payment network.

The single-use payment information can be provided 425 to the enrolled consumer. For example, providing 425 the single-use payment information from the payment processor to the enrolled consumer can comprise sending an email message to the email address of the enrolled consumer. Additionally or alternatively, the phone number of the enrolled consumer can comprise a phone number of a mobile phone and providing 425 the single-use payment information from the payment processor to the enrolled consumer can comprise sending a Short Message Service (SMS) message to the phone number of the enrolled consumer. Additionally or alternatively, a portion of the single-use payment information, such as single-use Primary Account Number, can be sent 425 directly to the merchant system, while other portions of that single-use, such as One Time Password, are sent to the consumer/user.

A request to process payment of the card-not-present transaction can be received 435. The request can include the dynamic PAN and cardholder verification information. For example, the cardholder verification information can comprise the one-time password. In another example, the cardholder verification information can comprise the one time password combined with a Personal Identification Number (PIN) of the enrolled consumer. A determination 435 can be made as to the authenticity of the payment request. That is, the request to process payment of the card-not-present transaction can be authenticated based on the dynamic PAN and cardholder verification information from the request to process payment of the card-not-present transaction. If 435 the request to process payment of the card-not-present transaction is authenticated, the true PAN for the enrolled consumer can be determined 440 and payment of the card-not-present transaction can be processed 445 using the true PAN for the enrolled consumer.

Figure 5:
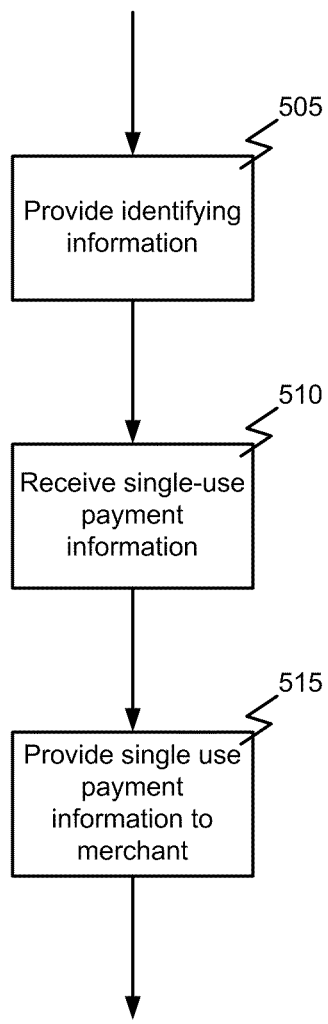
FIG. 5 is a flowchart illustrating a process for conducting of a card-not-present transaction according to one embodiment of the present invention.

FIG. 5 is a flowchart illustrating a process for conducting of a card-not-present transaction according to one embodiment of the present invention. More specifically, this example illustrates processes as may be performed by a client system as described above. In this example, processing begins with providing 505 to a payment processor system information identifying an enrolled consumer. In response, a set of single-use payment information can be received 510. For example, receiving the set of single-use payment information can comprise receiving an email message or a Short Message Service (SMS) message. The set of single-use payment information can include at least a one-time password and a dynamic Primary Account Number (PAN). The dynamic PAN can be valid for a single transaction and does not reveal a true PAN of an enrolled consumer. The dynamic PAN and cardholder verification information can be provided 515 to a merchant system to affect payment of the card-not-present transaction. For example, the cardholder verification information can comprise the one time password combined with a Personal Identification Number (PIN) of the enrolled consumer.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of processing a card-not-present transaction, where the transaction is processed with a primary account number and cardholder verification information, the method comprising:

receiving, by a payment processor system, a request for a card-not-present transaction involving an enrolled consumer, the request including information identifying the enrolled consumer but wherein the information identifying the enrolled consumer is not sufficient for conducting a financial transaction;

reading, by the payment processor system, a record of information related to the enrolled consumer;

authenticating the enrolled consumer, by the payment processor system, based at least in part on the information of the request identifying the enrolled consumer and the record of information related to the enrolled consumer;

in response to authenticating the enrolled consumer, generating, by the payment processor system, a set of single-use payment information, the set of single-use payment information including at least both a one-time password and a separate dynamic Primary Account Number (PAN), wherein the dynamic PAN is valid for a single transaction and does not reveal a true PAN of the enrolled consumer;

providing single-use payment information from the payment processor system to a merchant and to the enrolled consumer, including providing a portion of the set of single-use payment information directly to a merchant system while providing another portion of the set of single-use payment information to the enrolled consumer for the consumer to provide to the merchant, with the one-time password for use in place of true cardholder verification information and the dynamic PAN for use in place of a true PAN and;

receiving, by the payment processor system, both the one-time password and the separate dynamic PAN as provided to the merchant and the enrolled consumer, in order to process the card-not-present transaction, including:

receiving, by the payment processor system, from the merchant system a request to process payment of the card-not-present transaction, the request including the dynamic PAN in place of a true PAN and the one-time password in place of true cardholder verification information;

authenticating the request to process payment of the card-not-present transaction, by the payment processor system, based on the dynamic PAN and the one-time password from the request to process payment of the card-not-present transaction;

in response to authenticating the request to process payment of the card-not-present transaction, determining, by the payment processor system, the true PAN for the enrolled consumer; and processing payment of the card-not-present transaction, by the payment processor system, using the true PAN for the enrolled consumer.

2. The method of claim 1, wherein receiving the request for the card-not-present transaction comprises receiving the request from a client device of the enrolled consumer.

3. The method of claim 1, wherein receiving the request for the card-not-present transaction comprises receiving the request from a mobile device of the enrolled consumer.

4. The method of claim 1, wherein receiving the request for the card-not-present transaction comprises receiving the request from the merchant system of a merchant involved in the transaction.

5. The method of claim 1, wherein the information identifying the enrolled consumer comprises a phone number of the enrolled consumer.

6. The method of claim 1, wherein the information identifying the enrolled consumer comprises an email address of the enrolled consumer.

7. The method of claim 1, wherein the information identifying the enrolled consumer comprises a last four digits of the true PAN.

8. The method of claim 1, wherein the record of information related to the consumer includes the true PAN and information selected from a group consisting of a phone number of the enrolled consumer and an email address of the enrolled consumer.

9. The method of claim 8, wherein providing the set of single-use payment information from the payment processor to the enrolled consumer comprises sending an email message to the email address of the enrolled consumer.

10. The method of claim 8, wherein the phone number of the enrolled consumer comprises a phone number of a mobile phone and wherein providing the set of single-use payment information from the payment processor to the enrolled consumer comprises sending a Short Message Service (SMS) message to the phone number of the enrolled consumer.

11. The method of claim 8, wherein providing the set of single-use payment information from the payment processor comprises providing the set of single-use payment information to a client device or a mobile device of the enrolled consumer.

12. The method of claim 8, wherein providing the set of single-use payment information from the payment processor, further comprises providing the set of single-use payment information directly to the merchant system.

13. The method of claim 1, wherein generating the dynamic PAN is based on the true PAN but does not reveal the true PAN.

14. The method of claim 13, wherein the dynamic PAN retains a portion of the true PAN for routing of the request to process payment of the card-not-present transaction to the payment processor system via a payment network.

15. The method of claim 13, wherein the dynamic PAN retains the right-most 4 digits of the true PAN.

16. The method of claim 1, wherein the portion of the set of single-use payment information provided directly to the merchant system comprises the dynamic PAN and wherein the another portion of the set of single-use payment information provided to the enrolled consumer comprises the one-time password.

17. A system for conducting a card-not-present transaction, where the transaction is processed with a primary account number and cardholder verification information, comprising:
a merchant system configured to provide an e-commerce website;
a client device adapted to access the e-commerce website; and
a payment processor system communicatively coupled with the merchant system and the client device, wherein the payment processor system maintains enrollment information for a user of the client device,
wherein the client device initiates a card-not-present transaction with the merchant system through the e-commerce website and requests a set of single-use payment information from the payment processor system,
wherein the payment processor system receives the request for the card-not-present transaction, the request including information identifying the user of the client device but wherein the information identifying the user of the client device is not sufficient for conducting a financial transaction, reads the enrollment information for the user of the client device, authenticates the user of the client device based at least in part on the information of the request identifying the user of the client device and the enrollment information for the user of the client device, and in response to authenticating the user of the client device, generates the set of single-use payment information, the set of single-use payment information including at least both a one-time password for use in place of true cardholder verification information and a separate dynamic Primary Account Number (PAN) for use in place of a true PAN, wherein the dynamic PAN is valid for a single transaction and does not reveal a true PAN of the user of the client device, and wherein the payment processor system provides single-use payment information to a merchant and to the enrolled customer, including providing a portion of the set of single-use payment information directly to the merchant system while providing another portion of the set of single-use payment information to the enrolled consumer for the consumer to provide to the merchant,
wherein the merchant system receives the dynamic PAN and one-time password and sends a request to process payment of the card-not-present transaction to the payment processor system, the request including the dynamic PAN and one-time password, and
wherein the payment processor system receives the request to process payment of the card-not-present transaction from a merchant system, including the dynamic PAN and the one-time password, authenticates the request to process payment of the card-not-present transaction based on the dynamic PAN and the one-time password from the request to process payment of the card-not-present transaction, and in response to authenticating the request to process payment of the card-not-present transaction, determines the true PAN for the user of the client device from the enrollment information for the user of the client device and processes payment of the card-not-present transaction using the true PAN for the user of the client device.

18. The system of claim 17, wherein the payment processor system receives the request for the card-not-present transaction from the client device.

19. The system of claim 17, wherein the payment processor system receives the request for the card-not-present transaction from a mobile device of the enrolled consumer.

20. The system of claim 17, wherein the payment processor system receives the request for the card-not-present transaction from the merchant system.

21. The system of claim 17, wherein the information identifying the user of the client device comprises one or more of a phone number, an email address, and a last four digits of the true PAN.

22. The system of claim 17, wherein the enrollment information for the user of the client device includes the true PAN and information selected from a group consisting of a phone number and an email address.

23. The system of claim 22, wherein the payment processing system provides the set of single-use payment information to the user by sending an email message including the set of single-use payment information from the payment processor system to the email address.

24. The system of claim 22, further comprising a mobile phone, wherein the phone number of the enrolled information comprises a phone number of the mobile phone and wherein the payment processing system provides the set of single-use payment information to the user by sending a Short Message Service (SMS) message including the set of single-use payment information from the payment processor system to the mobile phone.

25. The system of claim 17, wherein the portion of the set of single use payment information provided directly to the merchant system comprises the dynamic PAN and wherein the another portion of the set of single use payment information provided to the enrolled customer comprises the one-time password.

\* \* \* \* \*